Figure 3:
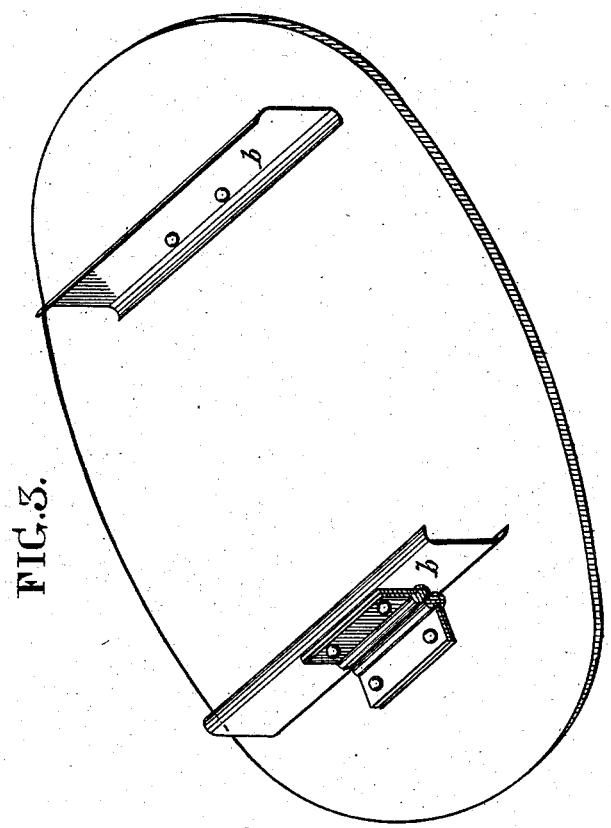

2 Sheets—Sheet 1.
A. A. LEHNERT.
PANS FOR ROASTING AND BAKING MEATS.
No. 192,074. Patented June 19, 1877.
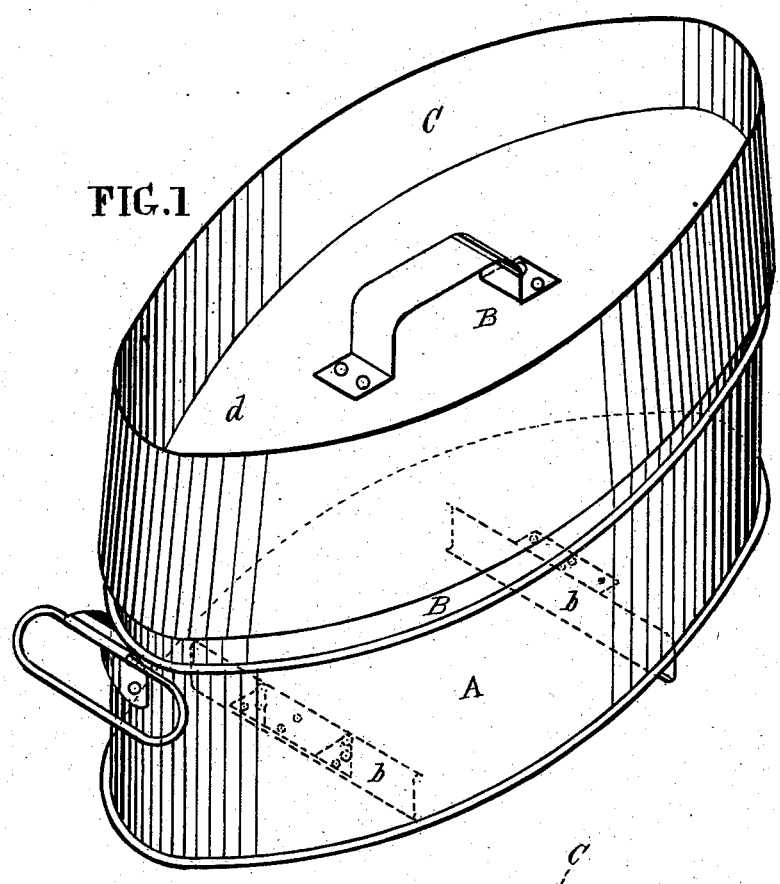
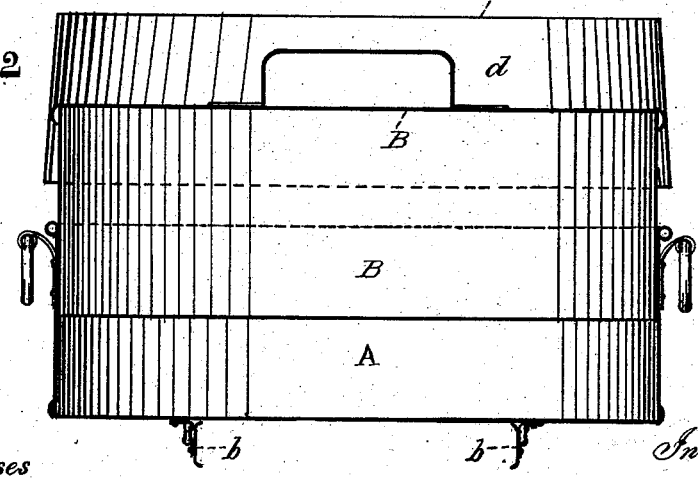
Witnesses
Thomas J. Bewley
George C. Hazel
Inventor
Amalie A. Lehnert
per Stephen Ustick Attorney
N. PETERS, PHOTO-LITHOGRAPHER, WASHINGTON, D. C.

2 Sheets—Sheet 2.

A. A. LEHNERT.
PANS FOR ROASTING AND BAKING MEATS.

No. 192,074. Patented June 19, 1877.

Witnesses
Thomas J. Dewley
Robert S. Williams

Inventor
Amalie A. Lehnert
per Stephen Ustick Attorney

UNITED STATES PATENT OFFICE.

AMALIE A. LEHNERT, OF PHILADELPHIA, PENNSYLVANIA.

IMPROVEMENT IN PANS FOR ROASTING AND BAKING MEATS.

Specification forming part of Letters Patent No. 192,074, dated June 19, 1877; application filed September 14, 1876.

*To all whom it may concern:*

Be it known that I, AMALIE A. LEHNERT, of the city and county of Philadelphia, in the State of Pennsylvania, have invented a new and useful Improvement in Pans for Baking, Roasting, or otherwise Cooking Meats or other articles of food, which improvement is fully set forth in the following specification and accompanying drawings, in which—

Figure 1 is an isometrical view of my improved cooking-pan, and Fig. 2 is a vertical longitudinal section of the same; and Fig. 3 is a bottom view.

My invention relates to the following particular features: To the bottom of the pan are hinged bars for elevating it above the coals, and to provide for increasing or decreasing the space between the coals and the bottom at pleasure, to regulate temperature of the pan, the bars being larger in one direction in their cross-section than in the other, so that by changing the position of the bars their vertical projection from the bottom of the pan will be varied, as hereinafter fully described. To the pan is fitted an elevated cover, the lower edge of which fits tightly against the vertical sides of the pan, inside of the same, to prevent the escape of steam, and thereby to keep the juices of the articles to be cooked within the pan. To the top of this raised cover is fitted an annular rim, which projects upward therefrom a sufficient distance to hold coals or other fuel when it is desirable to cook from the top as well as from the bottom, to increase the rapidity of the cooking or otherwise improve it. When the rim is not filled with coals of fire it serves the purpose of radiating the heat from the top and sides of the cover, to prevent the articles of food cooking too rapidly. I make the rim either detachable from the cover or fast to it, at pleasure.

A represents my improved cooking-pan, having bars $b\ b$ hinged to its bottom, so that they may be turned down with their flat sides on the coals to decrease the space between them and the bottom of the pan, or be turned edgewise to them, as seen in the drawings, to increase the depth of the space, and thus to regulate the temperature of the air within the pan, as may be required.

The bars are represented in the drawings transversely across the bottom of the pan; but, if desired, they may be arranged longitudinally therewith.

B is an elevated cover, the lower edge of which fits inside of the vertical sides of the pan, and thus prevents the steam escaping from the interior of the pan, to keep all the juices within the meat or other article to be cooked. C is an annular rim, which projects upward from the top of the cover B, to form a receptacle, $d$, for holding live coals or other fuel when it is desirable to cook downward from the top of the cover, as well as upward from the bottom of the pan.

Another purpose of the annular rim C, when not containing fuel, is to radiate the heat from the sides and bottom of the cover B, to prevent too rapid cooking, when necessary. The rim is made larger at its lower than at its upper edge to insure a tight fit when pressed down upon the cover, as shown in the drawings. It is made detachable from the cover, so as to use the latter either with or without it, at pleasure; but, if desired, it may be made fast to it, in which case its lower edge need not extend below the top of the cover.

I claim as my invention—

1. The hinged bars $b\ b$, in combination with the bottom of a baking and roasting pan, substantially in the manner and for the purpose set forth.

2. The elevated cover B, having on its top the receptacle $d$ for the reception of fuel, substantially in the manner and for the purpose set forth.

AMALIE A. LEHNERT.

Witnesses:
THOMAS J. BEWLEY,
CHAS. A. DUY.